No. 690,693. Patented Jan. 7, 1902.
E. VON BOYEN.
PROCESS OF MANUFACTURING MINERAL WAX FROM BITUMINOUS BROWN COAL.
(Application filed July 3, 1901.)
(No Model.) 2 Sheets—Sheet 1.

No. 690,693. Patented Jan. 7, 1902.
E. VON BOYEN.
PROCESS OF MANUFACTURING MINERAL WAX FROM BITUMINOUS BROWN COAL.
(Application filed July 3, 1901.)
(No Model.) 2 Sheets—Sheet 2.

UNITED STATES PATENT OFFICE.

EDGAR VON BOYEN, OF HAMBURG, GERMANY.

PROCESS OF MANUFACTURING MINERAL WAX FROM BITUMINOUS BROWN COAL.

SPECIFICATION forming part of Letters Patent No. 690,693, dated January 7, 1902.

Original application filed April 30, 1900, Serial No. 14,997. Divided and this application filed January 3, 1901. Serial No. 41,998. (No specimens.)

*To all whom it may concern:*

Be it known that I, EDGAR VON BOYEN, a citizen of Germany, residing at Hamburg-Steinwärder, in the German Empire, have invented certain new and useful Improvements in Processes for the Manufacture of Mineral Wax from Bituminous Brown Coal, (for which I have applied for patents in France, dated March 30, 1900; in Germany, dated October 9, 1899; in England, dated March 30, 1900, and in Austria, dated October 12, 1899,) of which the following is a specification, being a divisional part of the specification accompanying the application filed on the 30th of April, 1900, bearing serial number 14,997.

My invention relates to an improved process for the production of mineral wax from the bituminous brown coal such as at present used for producing paraffin and mineral oil. The employment of other varieties of bituminous coal does not require alterations in the process, and the only difference resulting from the employment of different varieties is that a different quantity of product is obtained.

In my application, Serial No. 14,997, filed April 30, 1900, I have described and claimed a new product consisting of a mineral wax possessing greater value than the common products of distillation from bituminous brown coal and also a process for producing such mineral wax.

In my improved process, which is the subject of the present application, I subject the coal to direct distillation in the presence of superheated steam and subject the extract thus obtained to distillation in the presence of superheated steam and under rarefaction, as hereinafter described. The essential difference from application Serial No. 41,997, according to which the coal is first extracted with hot benzin and then the so-obtained extract further treated, lies in the fact that in the following process the extraction by means of benzin is avoided, which is costly on account of the inevitable loss of benzin.

Figure 1:
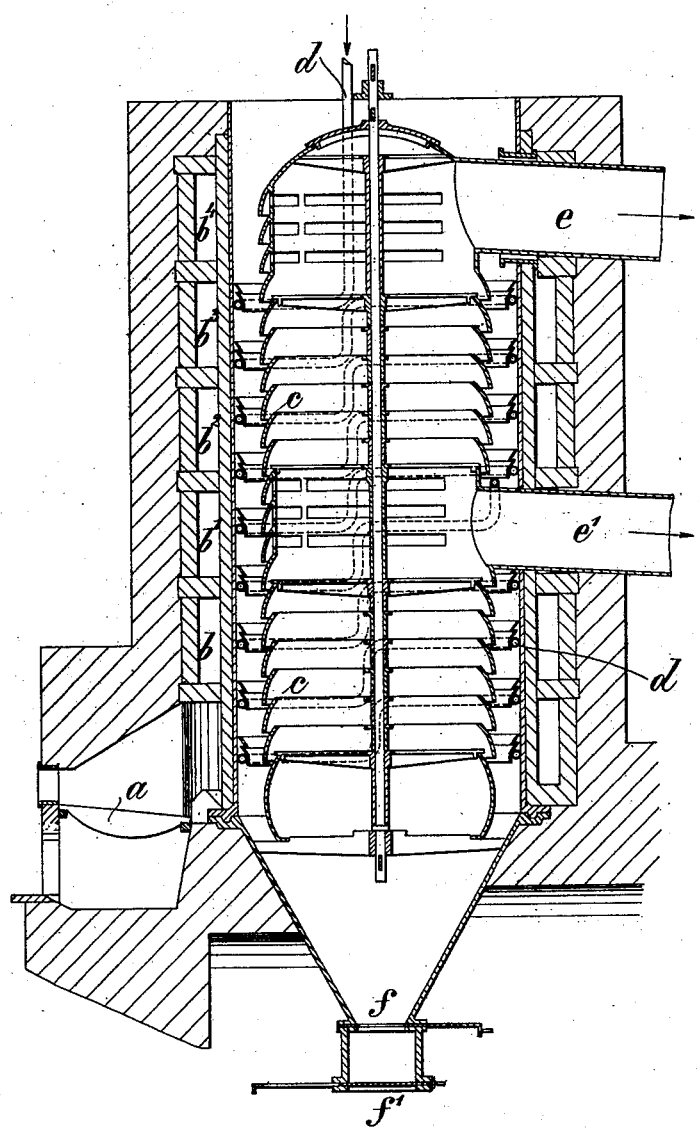
Figure 2:
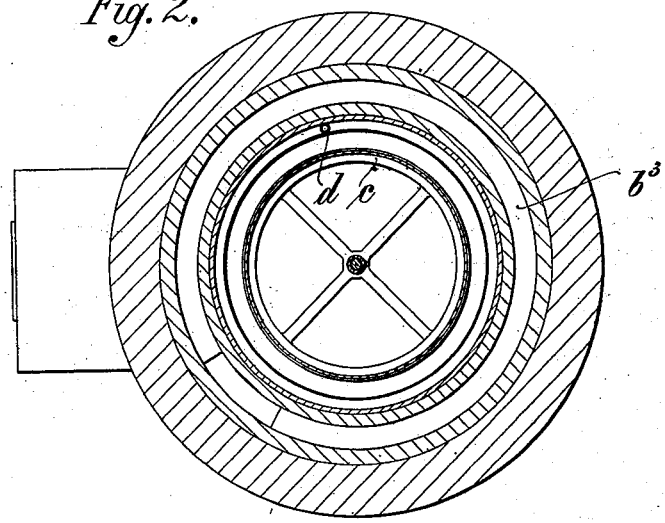
Figure 3:
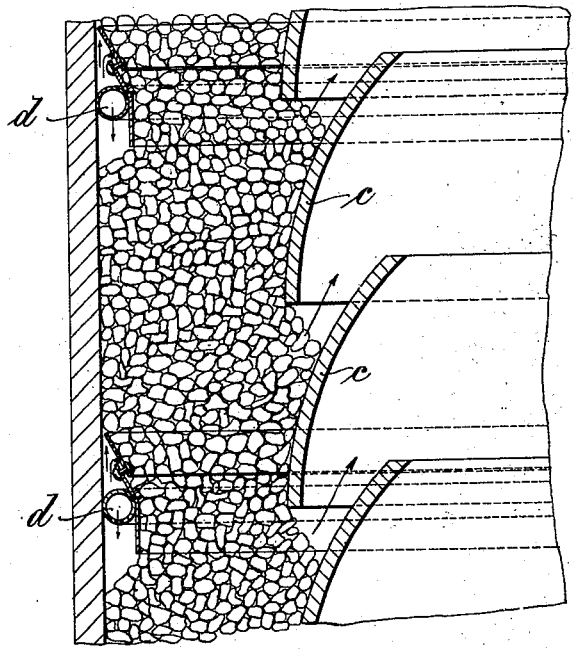

In the accompanying drawings, Figure 1 is a vertical section of a distilling apparatus suitable for use in carrying my process into effect. Fig. 2 is a horizontal section of the same. Fig. 3 is a detail vertical section of a portion of the same on a larger scale.

Referring to Fig. 1, $a$ represents the furnace-grate, and $b$ $b'$ $b^2$ $b^3$ $b^4$ annular flue-passages in communication with the said furnace.

$c$ $c$ represent a series of superposed truncated bells placed one within another, so as to leave spaces between them. In the annular space between the peripheries of these bells and the inner wall of the flue-passages $b$ $b$, &c., the coal to be distilled is placed, as shown in Fig. 3.

$d$ represents a steam-pipe disposed, as shown, in a number of rings or coils which are located in the annular space occupied by the coal. Each of these rings of steam-pipe is perforated, as indicated by arrows in Fig. 3. It will now be understood that when steam is passed into the pipe $d$ it will become superheated and will escape through the perforations in the several rings or coils, and, passing through the coal, will escape through the space between the bells $c$ and finally pass out through the exit-flues $e$ $e'$ while the coal is heated and distilled by the heat from the furnace conveyed through the flue-passage $b$ $b'$, &c.

$f$ $f'$ represent grates at the bottom of the apparatus for discharging coke when the distilling operation is completed.

In carrying out my invention I take bituminous brown coal, such as now commonly used for producing paraffin and mineral oil, and in the condition in which it comes from the pit and place it in suitable vessels or stills, such as are in common use for distilling such coal, and subject it to heat of from 250° to 350° centigrade until coked. During the same period a strong current of superheated steam at about the same temperature is directed through the body of coal in process of distillation. The best results are attained by employing steam of from 300° to 350° centigrade, and the quantity of steam employed is such that the condensate consists of from one-third to one-half of water and two-thirds to one-half of the distillate produced from the coal. The period required to complete the distillation varies somewhat, according to the temperature, and is determined by the coked condition of the residuum. The issuing vapors are condensed by suitable and customary means and yield a substance which melts above 70° centigrade that cannot be crystallized, but is easily saponified, differing consequently very materially from the common brown coal-tar. The temperature of the condenser is to be chosen so that the condensate may flow away at a temperature of about 80°. The distillate from this first process is now heated to about 300° centigrade in a still of common form provided with an exhausting attachment, and steam at about the same temperature is let into the mass, while the pressure is kept as low as possible by the exhausting attachment. The distillation commences at about 300° centigrade, yielding a yellow wax-like crystalline body having a melting-point of between 60° and 70° centigrade, which is the mineral wax in an impure condition. The distillation is continued until the residuum assumes the appearance of ordinary gas-coke.

The higher the vacuum the better is the result obtained. In practice with the usual pumps it is difficult, however, to reduce the pressure to less than that corresponding to a column of mercury about one hundred and fifty millimeters high.

Usually a single distillation suffices, and it is only when non-decomposed extract is carried over from the still, so that the product contains too many dark-colored impurities, that it becomes necessary to repeat the distillation. At a pressure of ten millimeters of mercury the mineral wax can be redistilled in a completely-undecomposed condition.

In order to obtain completely colorless wax from the yellow wax-like body now obtained, the latter is mixed in a molten condition with about ten per cent (10%) of mineral oil, such as refined American or Russian petroleum, or with similar organic solvents and then allowed to harden in the form of plates or cakes. These first cakes are subjected to pressure in hydraulic presses, and the mineral oil, together with the yellow coloring-matter, is thus pressed out. Any discoloration still remaining in the wax can be removed by means of animal charcoal or similar decoloring substance.

The purified mineral wax is a white hard crystalline substance having a melting-point of 70° centigrade or even higher, which unlike paraffin is easily saponified by an alkali and completely carbonized by concentrated sulfuric acid. The wax consists of two quite different substances—namely, an acid and an unsaturated hydrocarbon. These constituents can be separated by alkaline saponification in an alcoholic solution, the acid forming a potassium or sodium salt soluble in water and easily crystallized from alcohol, while the hydrocarbon, which is soluble only with difficulty in alcohol containing water, is separated. By heating with an aqueous or alcoholic solution of potassium or sodium hydrate or carbonate the corresponding salt is formed from the acid contained in the wax. To the potassium or sodium salt dissolved in heated alcohol is added dilute sulfuric acid in excess. The fatty acid is separated, floating at the top, while the sulfate of potassium or sodium is likewise separated and falls to the bottom. The acid can be separated from the alcohol in a separatory funnel.

The fatty acid obtained from the potassium salt by treatment with sulfuric acid or other mineral acid melts after repeated crystallization from organic solvents at 80° centigrade, invariably is soluble in benzin, benzene, glacial acetic acid, ether, and alcohol, and solidifies after being melted with a streaky crystalline appearance and has a specific gravity of 0.915.

The second constituent of the mineral wax—the unsaturated hydrocarbon—is easily soluble in benzin and benzene, difficultly soluble in glacial acetic acid, alcohol, and ether, and crystallizes into bright white scales, melting at 60° centigrade and having a specific gravity of 0.92. This hydrocarbon is also, unlike paraffin, carbonized by concentrated sulfuric acid.

The combination of the two substances—mineral wax—is a valuable product for many industrial branches and especially for the manufacture of candles.

What I claim, and desire to secure by Letters Patent of the United States, is—

The process hereinbefore described for producing mineral wax, which consists in distilling bituminous brown coal, in a dry condition in the presence of superheated steam and then distilling the extract thus obtained, in presence of superheated steam and under rarefaction, substantially as set forth.

In testimony whereof I have hereunto set my hand in the presence of two witnesses.

EDGAR VON BOYEN.

Witnesses:
GUSTAV WEBER,
E. H. L. MUMMENHOFF.